J. P. GRAY.
SIDE CURTAIN HOLDER.
APPLICATION FILED JULY 28, 1919.

1,345,086.

Patented June 29, 1920.

Inventor
Joseph P. Gray
by Nestall and Wallace
his Attorneys

UNITED STATES PATENT OFFICE.

JOSEPH P. GRAY, OF LOS ANGELES, CALIFORNIA.

SIDE-CURTAIN HOLDER.

1,345,086.  Specification of Letters Patent.  Patented June 29, 1920.

Application filed July 28, 1919. Serial No. 313,676.

*To all whom it may concern:*

Be it known that I, JOSEPH P. GRAY, a citizen of the United States, residing at Los Angeles, in the county of Los Angeles and State of California, have invented new and useful Improvements in Side-Curtain Holders, of which the following is a specification.

This invention relates to a device for holding the forward edge of the side curtains of an automobile top.

It is usual to equip automobile tops with a short curtain at the sides and rear adjacent to the rear seat. This side curtain is attached to the automobile top frame and to the body so that the forward edge is free. The wind encountered, especially in traveling, causes the free edge to flap, loosen and sometimes tear.

It is the principal object of this invention to provide a device for attachment to the top and body of automobiles, which will hold the side curtain rigid. Another object of this invention is to provide a device of the character described which will serve as a handle to assist passengers in mounting and dismounting from the automobile.

Figure 1:
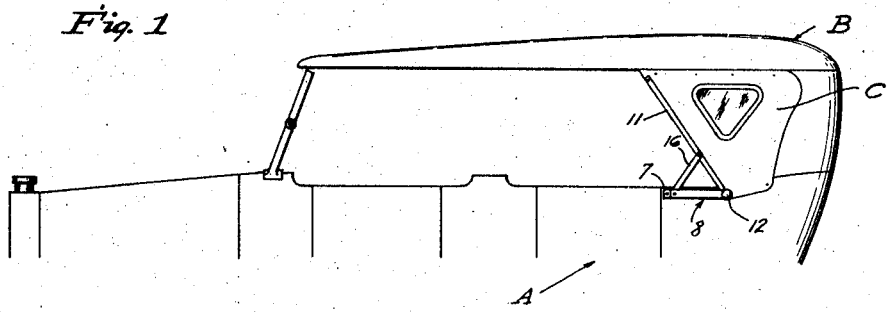
Figure 2:
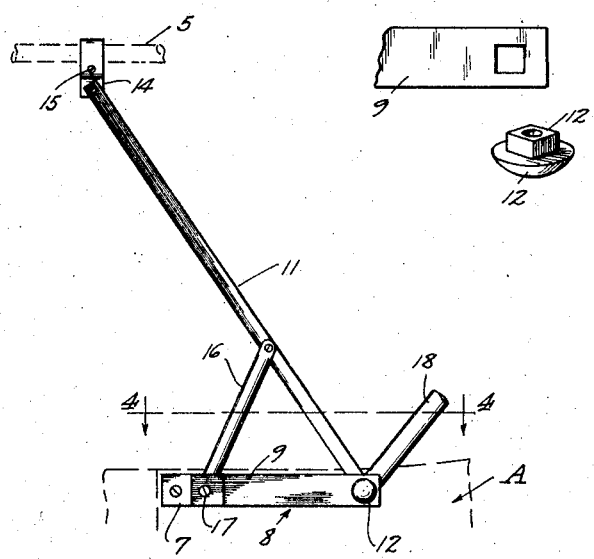
Figure 5:
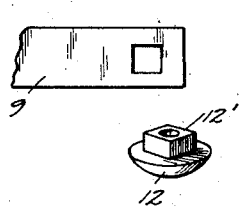
Figure 3:
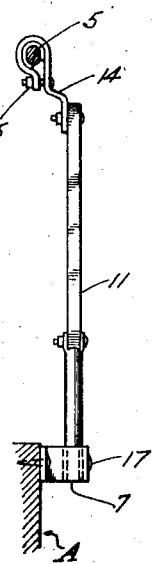
Figure 4:
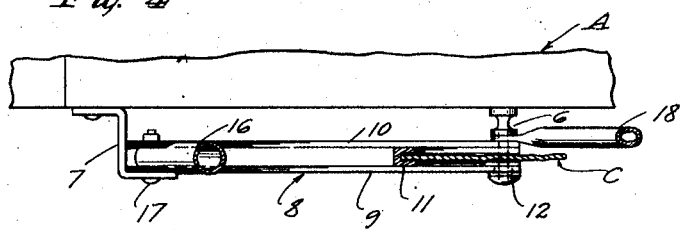

These objects will be more fully understood, as will also other objects and corresponding accomplishments of my invention, from the following detailed description of a preferred embodiment thereof. For the purpose of this description, reference is had to the accompanying drawing, in which:

Figure 1 is a side elevation of a fragment of an automobile body having a top and side curtains and equipped with my device; Fig. 2 is an enlarged side elevation of the device; Fig. 3 is a front elevation; Fig. 4 is an enlarged section taken on the line 4—4 of Fig. 2; and Fig. 5 is a perspective view of an extension bar and prop bolt.

Referring more particularly to the drawing and especially to Fig. 1, A indicates an automobile body to which is secured a top B. A side curtain is indicated by C. The top is supported upon a frame having side rods, one of which is indicated by 5 in Figs. 2 and 3.

Disposed on the body behind the rear door is a top prop bolt 6, to which one of the bows 18 for the top is adapted to be secured. Secured to the body adjacent to the rear door is a bracket 7, best shown in Fig. 4. Supported between the bracket 7 and bolt 6 is an extension 8. Referring particularly to Fig. 4, this extension consists of parallel bars 9 and 10 spaced apart. The bolt 6 extends through bars 9 and 10 and through a border bar 11, which is disposed between bars 9 and 10. Secured to the end of bolt 6 is a prop nut 12 lined on the inside of the head with a leather washer holding the extension in place on the body.

The border bar 11 is of channel form, the curtain C being secured at its edge in the channel by being pinched therein or by any other suitable means. Secured to the top of border bar 11 is a hanger strap 14 looped over the rod 5 and held in position by a bolt 15. I prefer to construct the hanger of iron strap lined on the inside with leather to prevent squeaking on the bow bar 5. Strap 14 offsets bar 11 so that the latter is vertical. Extending from bar 11 to the extension 8 with its end disposed between bars 9 and 10 and secured in position by a bolt 17 is a handle 16. This handle is positioned close to the rear door convenient to passengers in mounting or dismounting from the machine.

The nut 12 is of the usual form having a square shoulder 12' and a right hand female thread to correspond with the right hand thread on the bolt. Bar 9 has a square opening to fit over the square shoulder 12' and lock the nut. The extension 8 is placed over the bolt and the extension turned in the manner of a wrench until the nut is tightened. The bolt 17 is then placed in position to fasten the extension to bracket 7. The prop nut is thus securely locked.

A rigid support for the front of the side curtain is thus provided. At the same time the member 16 provides a handle for the use of passangers in mounting and dismounting from the automobile.

What I claim is:

1. In combination with an automobile having a top provided with a side curtain, a border bar secured to said curtain, means on said border bar for securing an end thereof to said automobile top, means to secure the bottom thereof to the automobile body, an extension secured to said border bar at its point of attachment to the body, and a handle extending between said bar and said extension.

2. In combination with an automobile having a top provided with a side curtain, a border bar secured to said curtain, a hanger on said border bar for securing the latter to said automobile top, a prop bolt on said body for securing said bar thereto, an extension secured to said body by said prop bolt, and a handle extending between said bar and said extension.

In witness that I claim the foregoing I have hereunto subscribed my name this 21st day of July, 1919.

JOSEPH P. GRAY.